(12) United States Patent
Segev et al.

(10) Patent No.: US 9,576,587 B2
(45) Date of Patent: Feb. 21, 2017

(54) EXAMPLE-BASED CROSS-MODAL DENOISING

(71) Applicant: TECHNION RESEARCH AND DEVELOPMENT FOUNDATION LTD., Haifa (IL)

(72) Inventors: Dana Segev, Binyamina (IL); Yoav Schechner, Kiryat Bialik (IL); Michael Elad, Kiriat Tivon (IL)

(73) Assignee: Technion Research & Development Foundation Ltd., Haifa (IL)

( * ) Notice: Subject to any disclaimer, the term of this patent is extended or adjusted under 35 U.S.C. 154(b) by 441 days.

(21) Appl. No.: 14/301,676

(22) Filed: Jun. 11, 2014

(65) Prior Publication Data

US 2014/0368700 A1 Dec. 18, 2014

Related U.S. Application Data

(60) Provisional application No. 61/833,993, filed on Jun. 12, 2013.

(51) Int. Cl.
| | |
|---|---|
| *G10L 21/0208* | (2013.01) |
| *H04N 21/439* | (2011.01) |
| *G10L 25/57* | (2013.01) |
| *G10L 15/25* | (2013.01) |

(52) U.S. Cl.
CPC ............ *G10L 21/0208* (2013.01); *G10L 15/25* (2013.01); *G10L 25/57* (2013.01); *G10L 2021/02087* (2013.01); *H04N 21/439* (2013.01)

(58) Field of Classification Search
CPC .......... H04N 5/21; H04N 5/213; H04N 5/217; H04N 5/357; H04N 5/60; H04N 5/602; H04N 5/607; H04N 1/38; H04N 21/439; H04N 21/4394; G10L 21/0208; G10L 2021/02087; G10L 25/57; G10L 15/24; G10L 15/25
USPC .... 381/71.1, 71.3, 94.1, 94.8; 348/241, 533, 348/607, 616
See application file for complete search history.

(56) References Cited

U.S. PATENT DOCUMENTS

| | | | |
|---|---|---|---|
| 8,660,841 B2 | 2/2014 | Barzelay | |
| 2006/0290699 A1* | 12/2006 | Dimtrva | G06K 9/00268 345/473 |
| 2010/0299144 A1* | 11/2010 | Barzelay | G10H 1/0008 704/233 |
| 2014/0161354 A1* | 6/2014 | Curcio | G06K 9/00718 382/190 |

* cited by examiner

*Primary Examiner* — Paul S Kim
*Assistant Examiner* — Sabrina Diaz
(74) *Attorney, Agent, or Firm* — Roach Brown McCarthy & Gruber, P.C.; Kevin D. McCarthy

(57) ABSTRACT

A method for cross-modal signal denoising, the method comprising using at least one hardware processor for: providing a first multi-modal signal comprising at least two relatively clear modalities; correlating features exhibited simultaneously in the at least two relatively clear modalities of the first multi-modal signal; providing a second multi-modal signal comprising at least one relatively noisy modality and at least one relatively clear modality; and denoising the at least one relatively noisy modality of the second multi-modal signal by associating between (a) features exhibited in the at least one relatively noisy modality of the second multi-modal signal and (b) the features of the first multi-modal signal.

27 Claims, 7 Drawing Sheets

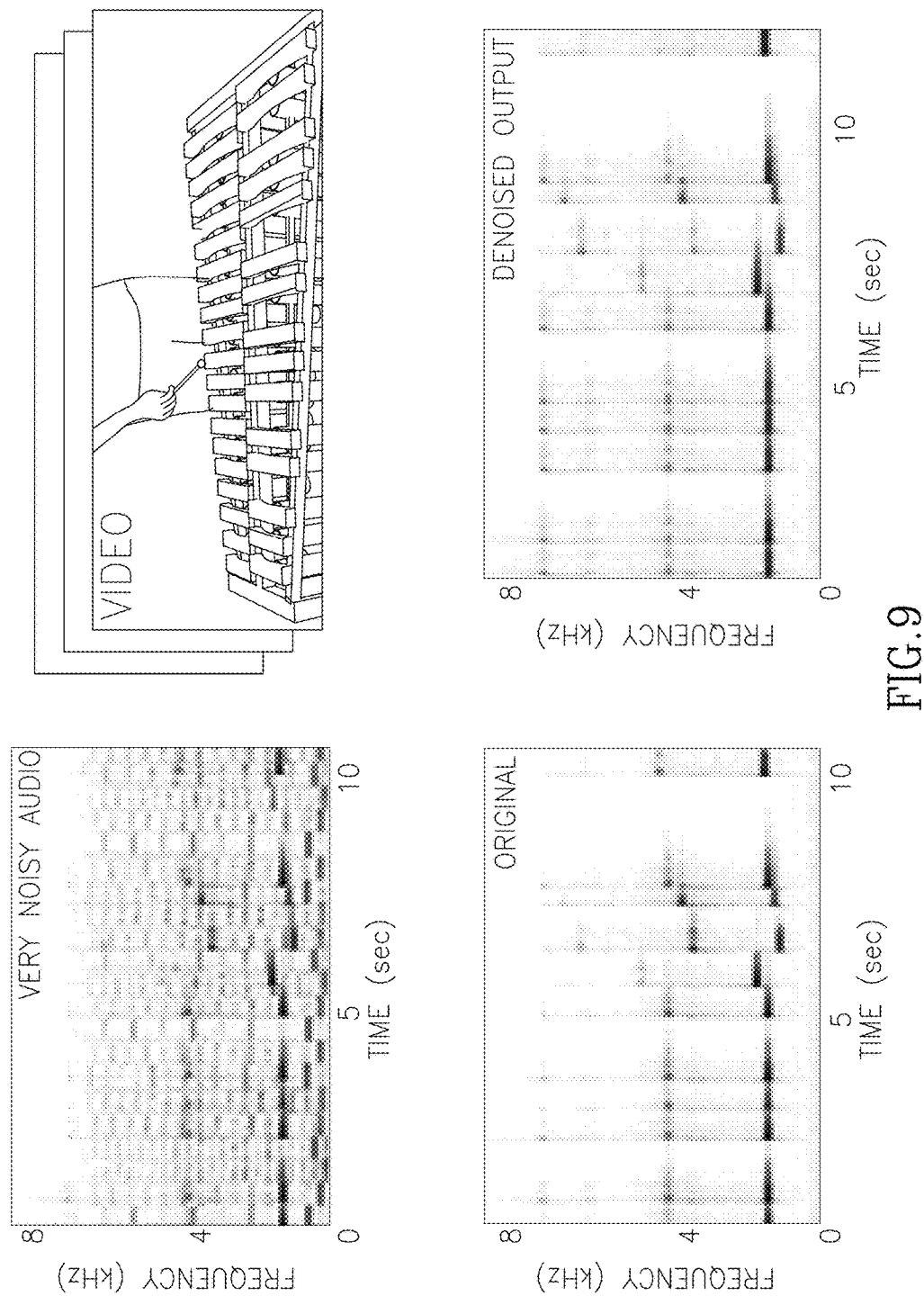

EXAMPLE-BASED CROSS-MODAL DENOISING

CROSS-REFERENCE TO RELATED APPLICATIONS

This application claims the benefit of U.S. Provisional Patent Application No. 61/833,993, filed Jun. 12, 2013, which is incorporated herein by reference in its entirety.

FIELD OF THE INVENTION

The invention relates to the field of media denoising.

BACKGROUND

Unimodal single-channel audio denoising and source separation are long studied problems. They are especially difficult to address when the intensity of the noise is very high (overwhelming the signal) and non stationary (structured). This is often referred to as the cocktail party problem, which is very challenging, especially when only a single sensor (microphone) is accessible. In audio-video (AV) studies, source separation assumes that all the audio sources are visible in the field of view, e.g., a couple of speakers are seen while they speak. AV analysis, in general, is an emerging topic, prompting studies in a range of interesting tasks. Some vision methods were adapted to unimodal audio analysis.

In audio denoising, noise is commonly assumed to be stationary. Nevertheless, there are unimodal source separation techniques which successfully accomplish separating non-stationary sources. Music and speech signals have inherently different statistics. Thus, many algorithms are distinct for each, while some are oriented to both. There, sparse representations of audio are used.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for cross-modal signal denoising, comprising: using a hardware processor, denoising a relatively noisy first modality of a multi-modal input signal, said denoising being based on an association between the relatively noisy modality and a relatively clear second modality of the multi-modal input signal.

There is further provided, in accordance with an embodiment, an apparatus comprising: an image sensor configured for video capture; a microphone; and at least one hardware processor configured to: (a) receive a relatively clear video modality from said image sensor and a relatively noisy audio modality from said microphone, and (b) denoise the relatively noisy audio modality based on an association between the relatively noisy audio modality and the relatively clear video modality.

There is further provided, in accordance with an embodiment, a computer program product for cross-modal signal denoising, comprising a non-transitory computer-readable storage medium having program code embodied therewith, the program code executable by at least one hardware processor to: denoise a relatively noisy first modality of a multi-modal input signal, said denoising being based on an association between the relatively noisy modality and a relatively clear second modality of the multi-modal input signal.

There is further provided, in accordance with an embodiment, a method for cross-modal signal denoising, the method comprising using at least one hardware processor for: providing a first multi-modal signal comprising at least two relatively clear modalities; correlating features exhibited simultaneously in the at least two relatively clear modalities of the first multi-modal signal; providing a second multi-modal signal comprising at least one relatively noisy modality and at least one relatively clear modality; and denoising the at least one relatively noisy modality of the second multi-modal signal by associating between (a) features exhibited in the at least one relatively noisy modality of the second multi-modal signal and (b) the correlated features of the first multi-modal signal.

There is further provided, in accordance with an embodiment, an apparatus comprising: an image sensor configured for video capture; a microphone; a non-transient memory having stored thereon correlated features exhibited simultaneously in a relatively clear video modality and in a relatively clear audio modality both belonging to a first multi-modal signal; and at least one hardware processor configured to: receive a second multi-modal signal comprising a relatively clear video modality from said image sensor and a relatively noisy audio modality from said microphone, and denoise the relatively noisy audio modality of the second multi-modal signal by associating between (i) features exhibited in the relatively noisy audio modality of the second multi-modal signal and (ii) the correlated features of the first multi-modal signal.

There is further provided, in accordance with an embodiment, a computer program product for cross-modal signal denoising, comprising a non-transitory computer-readable storage medium having program code embodied therewith, the program code executable by at least one hardware processor to: provide a first multi-modal signal comprising at least two relatively clear modalities; correlate features exhibited simultaneously in the at least two relatively clear modalities of the first multi-modal signal; provide a second multi-modal signal comprising at least one relatively noisy modality and at least one relatively clear modality; and denoise the at least one relatively noisy modality of the second multi-modal signal by associating between (a) features exhibited in the at least one relatively noisy modality of the second multi-modal signal and (b) the correlated features of the first multi-modal signal.

There is further provided, in accordance with an embodiment, a method for cross-modal signal denoising, the method comprising using at least one hardware processor for:

providing correlated features exhibited simultaneously in a relatively clear video modality and in a relatively clear audio modality both belonging to a first multi-modal signal; providing a second multi-modal signal comprising at least one relatively noisy modality and at least one relatively clear modality; and denoising the at least one relatively noisy modality of the second multi-modal signal by associating between (a) features exhibited in the at least one relatively noisy modality of the second multi-modal signal and (b) the correlated features of the first multi-modal signal.

In some embodiments, said at least one hardware processor is further configured to replace the features exhibited in the relatively noisy audio modality of the second multi-modal signal with the features exhibited in the relatively clear audio modality of the first multi-modal signal.

In some embodiments, said at least one hardware processor is further configured to divide the relatively clear audio modality of the first multi-modal signal into a plurality of temporal segments.

In some embodiments, said program code is further executable to divide one of the at least two relatively clear modalities of the first multi-modal signal into a plurality of temporal segments.

In some embodiments, said denoising comprises replacing the features exhibited in the at least one relatively noisy modality of the second multi-modal signal with the features exhibited in one of the at least two relatively clear modalities of the first multi-modal signal.

In some embodiments, said replacing is based on a statistical analysis of the features of: one of the at least two relatively clear modalities of the first multi-modal signal; and features exhibited in the at least one relatively clear modality of the second multi-modal signal.

In some embodiments, said replacing is based on a pattern recognition of the features of: one of the at least two relatively clear modalities of the first multi-modal signal, and features exhibited in the at least one relatively clear modality of the second multi-modal signal.

In some embodiments, the at least two relatively clear modalities of the first multi-modal signal are an audio modality and a video modality; the at least one relatively noisy modality of the second multi-modal signal is an audio modality; and the at least one relatively clear modality of the second multi-modal signal is a video modality.

In some embodiments, said denoising is performed by replacing features of the relatively noisy modality with features of a relatively clear reference portion preceding the relatively noisy modality.

In some embodiments, said replacing is further based on a statistical analysis of the features of the relatively clear reference portion and the relatively clear modality.

In some embodiments, said replacing is further based on a pattern recognition of the features of the relatively clear modality and the features of the relatively clear reference portion.

In some embodiments, the relatively noisy modality and the relatively clear reference portion are audio modalities; and the relatively clear modality is a video modality.

In some embodiments, the method further comprises dividing the relatively clear reference portion into a plurality of temporal segments.

In some embodiments, each of the plurality of temporal segments is between 0.2 and 0.4 seconds long.

In some embodiments, said at least one hardware processor is further configured to replace features of the relatively noisy audio modality with features of a relatively clear reference portion preceding the relatively noisy audio modality.

In some embodiments, said at least one hardware processor is further configured to divide the relatively clear reference portion into a plurality of temporal segments.

In some embodiments, said program code is further executable by said at least one hardware processor to divide the relatively clear reference portion into a plurality of temporal segments, wherein each of the plurality of temporal segments is between 0.2 and 0.4 seconds long.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 9 shows an illustration of an input video with a noisy soundtrack, in accordance with some embodiments.

DETAILED DESCRIPTION

Figure 1:
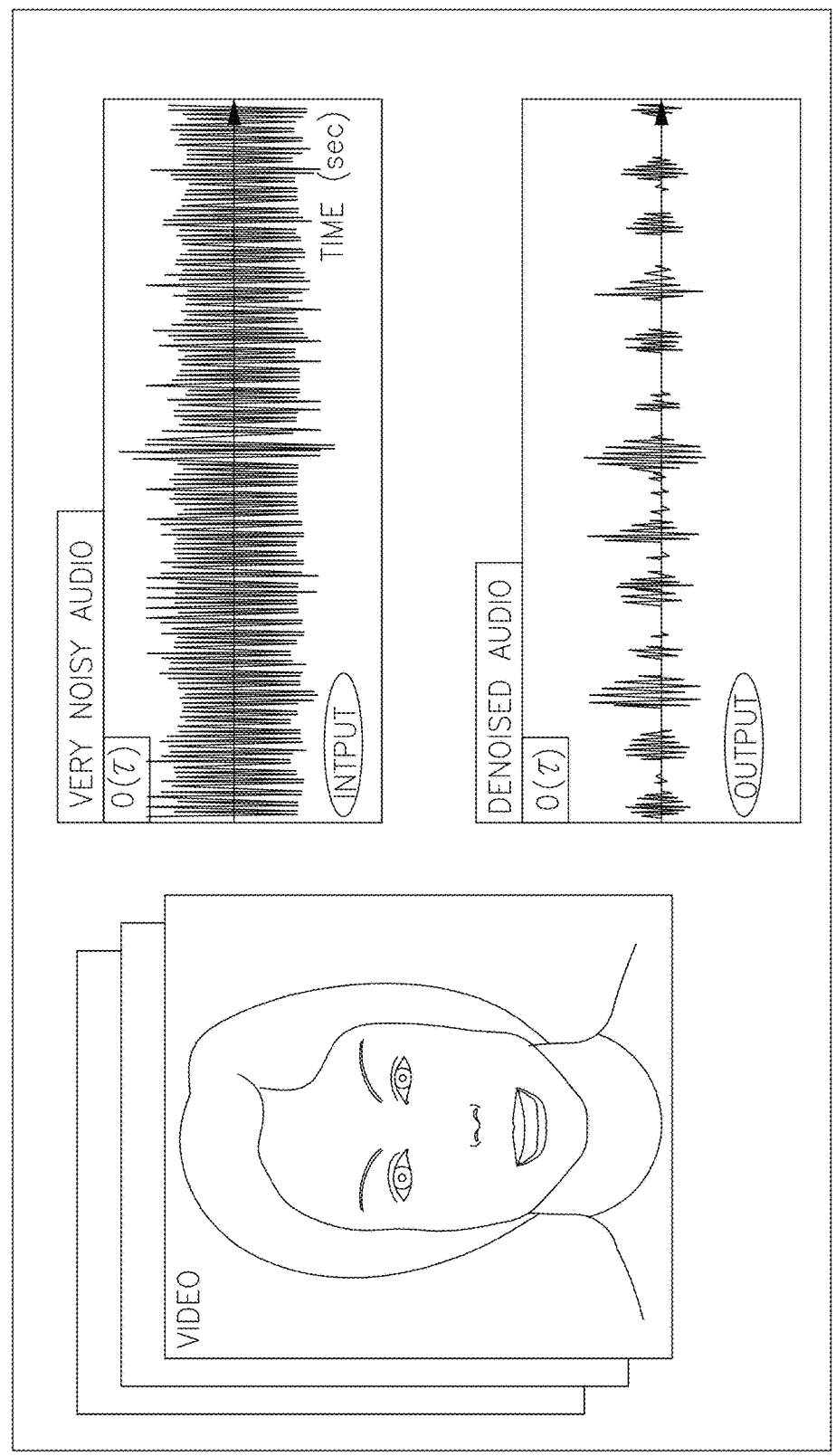
FIG. 1 shows an illustration of a video and a noisy soundtrack, denoised according to present embodiments.

Methods for cross-modal signal denoising disclosed herein. The methods may be employed to denoise a noisy modality existing in a multi-modal signal. The terms "modality" and "modal", in this regard, refer to a type of a sub-signal contained within a broader signal of data. For example, an audiovisual signal is multi-modal signal, since it typically contains audio and video modalities. The present methods may apply to other types of signals and modalities as well.

Cross-modal signal denoising, in accordance with some embodiments, may be performed by replacing features of a noisy modality of an input multi-modal signal with features of a first clear modality of a reference multi-modal signal. The replacing is optionally based on an association between features of the clear modality of the input multi-modal signal and features of a second clear modality of the reference multi-modal signal, and hence the term cross-modal. In the audiovisual example, the input multi-modal signal may include a noisy audio modality and a clear video modality. To denoise the noisy audio, a reference multi-modal signal is used. The reference signal includes clear audio and video modalities, which enable a training stage in which features exhibited simultaneously in these modalities are associated. As an example, a "feature vector" may be the visual and audible representation of a person's mouth expressing a syllable. Once every audible representation is associated with a visual representation of the same syllable, this association is used to match features of the clear video modality of the input signal with features of the video modality of the reference signal, and consecutively to replace noisy features in the noisy audio modality with matching clear features of the reference signal.

The present denoising methods may be highly advantageous, for example, when used with modern cameras which are many times a part of a multisensory system with an integrated computer. Smart phones, tablets and a range of other computing devices integrate cameras with a suite of other sensors, including a microphone, a accelerometer, a magnetometer, etc., all accessible in synchrony through an integrated computer. The affordability and dramatic spread of these integrated systems revolutionizes computer vision. Vision becomes cross-modal. For example, accelerometers are used in conjunction to cameras for disambiguating structure from motion and initializing image stabilization and mosaicing. Computer vision thus starts evolving to cross-modal sensing, where vision and other sensors cooperate.

Cross-modal analysis is also biologically-motivated: human and animals integrate vision with other senses. In nature, visual events are often accompanied with sounds. Vision, according to present embodiments, may assist in denoising another modality. This principle is demonstrated here by using video to denoise audio. Unimodal (audio-only) denoising is said to be very difficult when the noise source is non-stationary, complex (e.g., another speaker or music in the background), strong and not individually accessible in any modality (unseen). Cross-modal association may help: a clear video can direct the audio estimator. This is shown here using an example-based approach. A training movie having clear audio provides cross-modal examples. In testing, cross-modal input segments having noisy audio rely on the examples for denoising. The video channel drives the search for relevant training examples. This is demonstrated in speech and music experiments.

Throughout the specification, discussions may be tied to a practical example, depicted in FIG. 1, of an input video accompanied by its soundtrack, which is highly corrupted by an unknown, unseen non-stationary noise source. The video is of a woman speaking, whose speech can hardly be comprehended due to extensive background noises. The output soundtrack is denoised with the aid of the video. An 8-second section of a 240-second movie is plotted in this figure.

In the present denoising, there may be no data about the auditory disturbance. The source of the noise may be in the background, inaccessible, unseen. In the presently-addressed problem, one modality suffers from strong noise which is non-stationary and unobserved directly. The modality is denoised using data from another, cleaner modality (video).

The present methods use training examples. Example-based methods are used in various computer-vision tasks. A training movie has a relatively clean audio. This enables prior learning of cross-modal association. Based on the learned association and clean training examples, it is possible in testing to use the clean modality (video) to help denoise the other (audio). For example, a smart phone has a microphone and a camera aiming at the user's face. Video calls from a quiet home create a clean example database. Later, calls are made in audio-noisy places such as a train station, bar or workshop. There, the clear audio example set can be used to denoise the voice. The examples are easily found since the video is relatively undisturbed. Another example is music: suppose undisturbed examples of audio-videos of a drum are obtained. Later they can be used to isolate a drum's sound in a rock show.

Present embodiments may suffice a single microphone, and process music and speech using statistics applicable exclusively to each. The clear video enables audio denoising using simple mathematical operations. We cope with very low signal-to-noise ratio (SNR), under overwhelming non-stationary noise, even when both the desired signal and noise originate from the same source (For example, a xylophone melody suffering interference from a different xylophone melody.) In recent years, source separation algorithms assisted by video appeared. However, they assume that all audio sources appear in the visual data.

Example-based denoising is here altered and applied to cross-modal processing, in the context of AV signals. The formulation involves the following main steps:
 1. Defining multimodal signals.
 2. Extracting multimodal features.
 3. Learning feature statistics, based on training over natural signals (videos).
 4. Performing cross-modal pattern recognition on multimodal feature vectors.
 5. Rendering a denoised multimodal signal.

The terms "relatively noisy modality" and "relatively clear modality", as referred to herein, are intended to be interpreted as follows: Firstly, the types of the relatively noisy modality and the relatively clear modality may be different. For example, the relatively noisy modality may be audio and the relatively clear modality may be video, or vice versa. The term "relatively noisy", in this regard, simply relates to the modality whose denoising is desired, whereas the term "relatively clear" relates to the modality which assists in the denoising. As these two modalities are of different types, it is not necessarily intended that their noise and/or clarity levels are quantitively comparable—although this might be the case in some scenarios. Rather, the "relatively clear modality" may be the modality which, based on a choice of the user, is sufficiently clear to assist in the denoising of the other, "relatively noisy modality".

Joint Signals

AV signals simultaneously evolve continuously: at time $\tau$, a camera senses an instantaneous object projection $v(\tau)$ while a microphone senses instantaneous air-pressure, whose temporal change is the audio $a(\tau)$. The signals are sampled. The sampling periods of the audio and video are $\Delta\tau^A$ and $\Delta\tau^V$, respectively. Define $\rho=\Delta\tau^V/\Delta\tau^A$. Typically, $O(\rho) \approx 800$.

Figure 2:
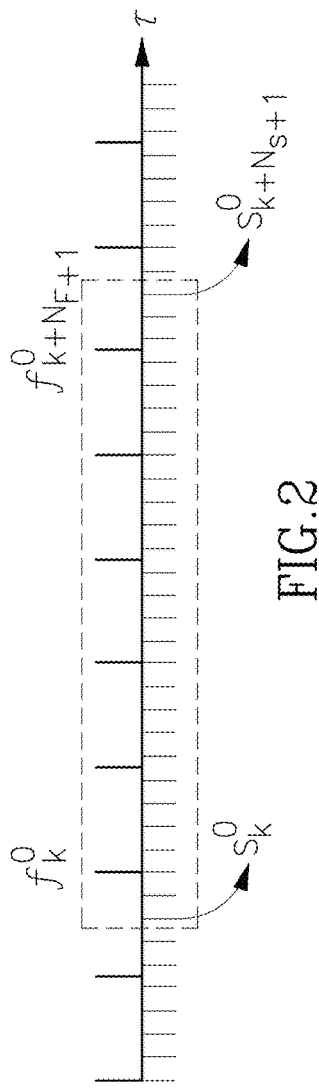
FIG. 2 shows a chart of frames and audio samples in a temporal segment, in accordance with some embodiments.

A training video is divided into temporal segments, each $N_F$ frames long. We define an example as a temporal segment composed of video ($v_e$) and audio ($a_e$) components. Consider k as an example index. The indices $[f_k^0, \ldots, (f_k^0+N_F-1)]$ are the frames in segment k, with $f_k^0$ being its initial frame. FIG. 2 shows the initial and final frames and audio samples in temporal segment k, where $\tau$ is continues time. Here both audio and video segments have the same temporal length.

The video data in this segment is a visual-example, $$e_k^V = [v_e(f_k^0) v_e(f_k^0+1) \ldots v_e(f_k^0+N_F-1)]. \tag{1}$$

The video segment is accompanied by an audio stream, containing $N_S$ samples. The audio sample indices in segment k are $[s_k^0, \ldots, (s_k^0+N_S-1)]$, where $s_k^0$ is the index of the first audio sample in this segment (FIG. 2). The audio data in this segment is an audio-example, $$e_k^A = [a_e(s_k^0), a_e(s_k^0+1), \ldots a_e(s_k^0+N_S-1)]. \tag{2}$$

The corresponding examples measure the same event simultaneously in their respective modalities.

The k-th AV joint example is the row vector $$e_k = [e_k^V \; e_k^A], \tag{3}$$

where $e_k^V$ and $e_k^A$ are given in Eqs. (1, 2). The example set of AV signals constitutes $$E=\{e_k\}_{k=1}^{N_E}. \quad (4)$$

Figure 3:
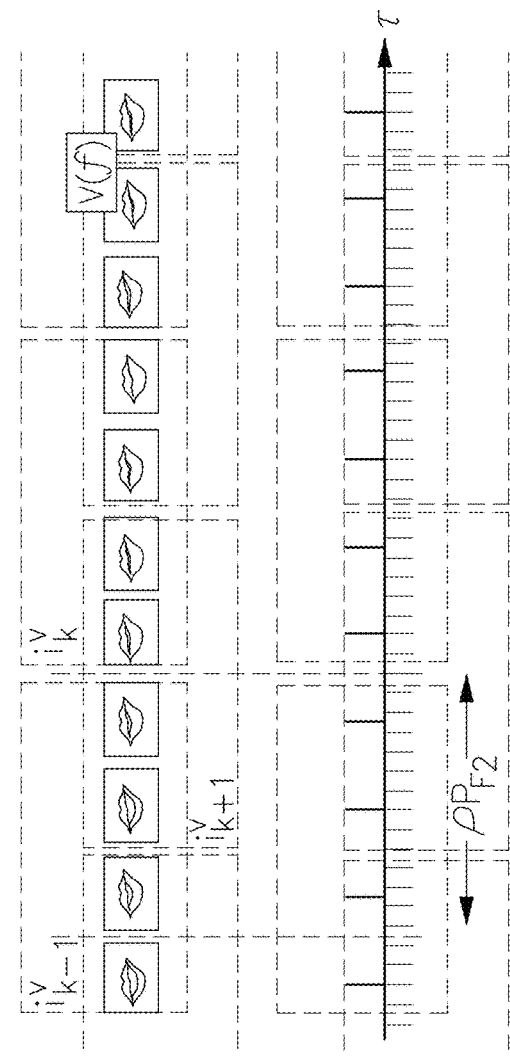
FIG. 3 shows a chart of periodic extraction of video and audio segments, in accordance with some embodiments.

The examples can now be used for processing new AV test data, based on a pattern recognition system. The test set of raw measured input test signals is $\{i_m\}_{m=1}^M$. Here, m indexes the input signal composed of video and audio components (FIG. 3). The input audio components are generally noisy and distorted, in contrast to signals obtained in a clutter-less environment during training The input sequence is divided into temporal segments, each including $N_F$ frames and $N_S$ audio samples. The data in the m-th segment is a visual-input $i_m^V$ and an audio-input $i_m^A$. Thus, the m-th AV joint input signal is the row vector $$i_m = [i_m^V \ i_m^A]. \quad (5)$$

There is a partial temporal overlap between input segments extracted from the raw sequence.

Each AV example and AV test input is pre-processed to yield a multimodal feature vector $$\tilde{e}_k = Z(e_k) = [\tilde{e}_k^V \ \tilde{e}_k^A], \ \tilde{i}_m = Z(i_m) = [\tilde{i}_m^V \ \tilde{i}_m^A]. \quad (6)$$

Here, $\tilde{e}_k^V$ and $\tilde{e}_k^A$ are respectively the visual and auditory feature row-vectors obtained from the k-th raw example. Similarly, $\tilde{i}_m^V$ and $\tilde{i}_m^A$ are respectively the visual and auditory feature vectors of the m-th raw input signal. The pre-process Z is described in Sec. 7. Between a feature vector of the m-th input signal to that of the k-th example, $d_V(\tilde{i}_m^V, \tilde{e}_k^V)$ and $d_A(\tilde{i}_m^A, \tilde{e}_k^A)$ measure the distance between visual feature vectors or auditory feature vectors, respectively. To equalize the audio distance and the video distance, both feature-vectors may be separately normalized. The distance measure can be the $l_2$ norm. FIG. 3 shows periodic extraction of video and audio segments. Consecutive segments partially overlap in time.

Feature Statistics as a Prior

Before processing input segments, the statistical nature of the signal may be established, using training The statistics then serve as prior knowledge, when processing a test sequence. As motivation, when listening to a familiar language, a strong prior is that some temporal sequences of syllables are highly probable (frequently appearing in words), while others much less so. The probability distribution of syllable temporal sequences is a prior, which can disambiguate speech under noise. Some of the present examples are motivated by language. However, they avoid a high-level approach that seeks division of the audio sequence into syllables. Instead, low-level audio features in example segments are used, as well as training data to learn a probability distribution of temporally consecutive segments.

The present exemplary segments are 0.28 sec long, approximately the duration of a single syllable. However, in other embodiments, segments may have a different length, and some segments may even have a length different from others. As an example, each segment may be between 0.2 and 0.4 seconds long.

Each example segment is turned into a feature vector $\tilde{e}_k$. The set of example feature vectors E (Eq. 4) undergoes clustering into C clusters (we use K-means for this). The proper number for C is debatable, as there are $O(10^4)$ potential syllable types. To reduce dimensionality in present experiments, the number of vowel×consonant combinations (in any order) was taken as rule-of-thumb, and then dictated C=350. In this way, clusters of AV segments are obtained. Segments in each cluster sound and look rather similar. Segments across clusters can efficiently be used in consecutive order to render speech.

Let segments have a fixed period of $p_F$ frames (see FIG. 3). For the k'th example segment, the feature vector belongs to cluster $c_k = c(\tilde{e}_k)$. The consecutive segment belongs to cluster $c_{k+P_F} = c(\tilde{e}_{k+P_F})$. The set of all consecutive segments corresponding to fixed clusters q, r ∈ [1, . . . C] is $$\Phi_{q,r} = \{k | c_k = r \text{ AND } c_{k+P_F} = q\}. \quad (7)$$

The probability for a transition from cluster q to r is estimated from the histogram of these sets, $$P(q, r) = |\Phi_{q,r}| / N_E. \quad (8)$$

Figure 4:
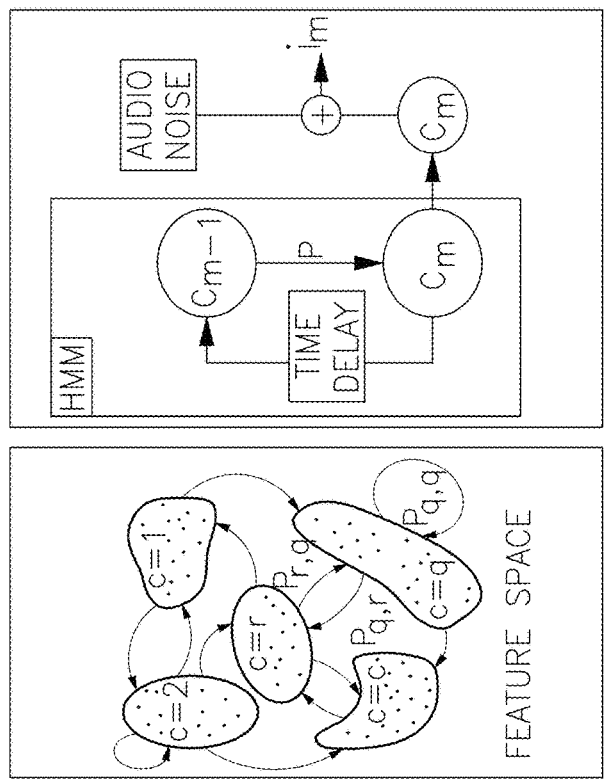
FIG. 4 shows an illustration of a feature space and signals from a hidden Makrov model, in accordance with some embodiments.

The clusters and their transitions are illustrated in FIG. 4. On the left side of the figure, feature vectors of segments are clustered. The probability of temporal transition from cluster q to cluster r is P (q, r). At the right side of the figure, signals stem from a hidden Markov model (HMM): an underlying cluster index c changes in time m based on P, yielding a clean segment $e_m$ (example). Audio noise interferes, resulting in a noisy raw segment $i_m$.

In a C×C matrix P, the (q, r) element is P (q, r). This matrix is a statistical prior that expresses the joint probability for consecutive signal segments. The prior views signals as derived from a hidden Markov model (HMM), as plotted in FIG. 4.

Cross-Modal Association

Association for each noisy input segment m to a single clean example whose index is $k_m$ is sought. A selected example $k_m$ should roughly replace the input audio segment $i_m^A$. This choice should satisfy two requirements:
1. The feature vectors of example $\tilde{e}_{k_m}$ and input $\tilde{i}_m$ should be similar. This requirement is expressed by a Data fidelity) term D in a cost function C, defined next.
2. Consistency with prior knowledge. In our case, it is encapsulated in matrix P (Sec. 4), which expresses the probability that $k_m$ is followed by $k_{m+1}$. This becomes a Regularization term R in C.

One example is selected per input segment m. Concatenating the sequence of selected examples, yields a vector of indices $k = [k_1, k_2, \ldots k_m \ldots k_M]$. The cost function is $C(k) = D(k) + \lambda R(k)$, where λ weights the regularization (prior) relative to the data term. The value of λ was set to 1.5 in the present experiments. The overall k that simultaneously optimizes C across the entire temporal domain is sought:

$$\hat{k} = \underset{k}{\operatorname{argmin}} [D(k) + \lambda R(k)]. \quad (9)$$

Figure 5:
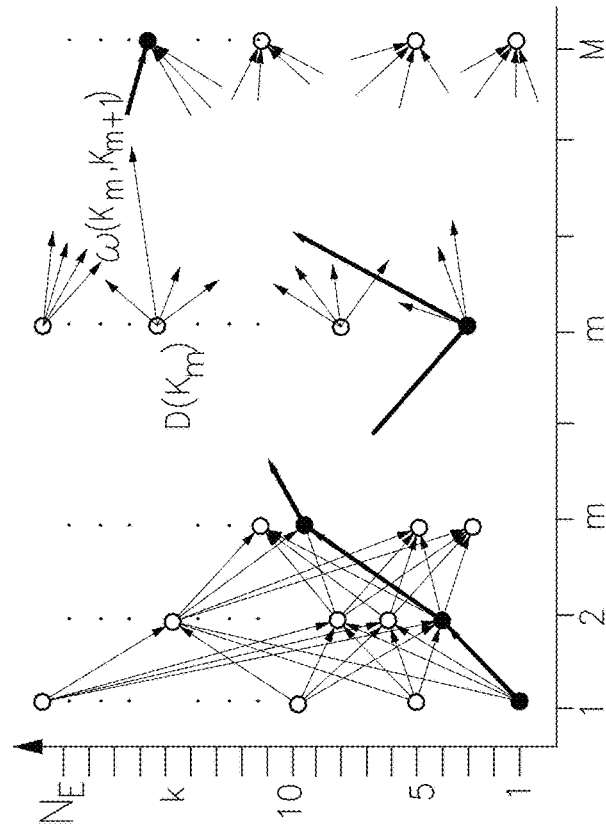
FIG. 5 shows a graph used for finding an optimal path, in accordance with some embodiments.

Once the data and regularization terms are defined, Eq. (9) can be solved. Eq. (9) is equivalent to finding a path in a graph, as illustrated in FIG. 5. In the figure, each pair (m, k) is equivalent to a graph node. Directed graph edges represent transitions between examples selected for consecutive input segments. We seek the optimal path in the graph (thick black arrows). Out of $N_E$ potential examples in the plot, only K=4 are considered for each m in this illustration. This beneficial focus is obtained by the visual modality.

A pair of input m and example k is a node in the graph. Directed edges in the graph represent transitions between examples selected for consecutive input segments. Graph node (m, k) carries a cost $D(k_m)$, while an edge between (m, $k_m$) and (m+1, $k_{m+1}$) has a cost $\lambda\omega(k_m, k_{m+1})$, which is defined in Sec. 5.1. As explained next, visual matching eliminates all examples except for $K \ll N_E$ candidates considered per m. The graph reduces to M×K active nodes and $(M-1)K^2$ edges. Vector k is a path in the graph, and k is the optimal path. The optimal path is efficiently found using dynamic programming over this graph.

Regularization Term R

At input segment m, the selected example is $k_m$. At the consecutive input segment, m+1, the selected example is $k_{m+1}$. These examples correspond to clusters $c_{k_m}$ and $c_{k_{m+1}}$. This pair has prior probability $P(c_{k_m}, c_{k_{m+1}})$. It is used to induce a cost $$\omega(k_m, k_{m+1}) = -\log P(c_{k_m}, c_{k_{m+1}}). \quad (10)$$

A low probability transition between example segments induces a high cost, while a highly likely transition induces little or no cost. The cost $\omega(k_m, k_{m+1})$ is a weight corresponding to each directed edge in the graph of FIG. 5. The term R sums Eq. (10) over all temporal input segments:

$$R(k) = -\sum_{m=1}^{M-1} \log P(c_{k_m}, c_{k_{m+1}}). \quad (11)$$

Data Term D

The input video in present examples is relatively clean, with sufficient quality. Only the audio is considered as noisy, and needs to be estimated. Being of good quality, the video features $\tilde{l}_m^V$ and $\tilde{l}_k^V$ have critical importance. They have a prime role in eliminating from E examples that are unrelated to $i_m$. In this way, visual features suggest candidate examples from E that are potentially close neighbors to $i_m$. However, visual information often does not have a clear one-to-one correspondence to audio. In speech, different sounds may be created by similar lip movements. Hence, visual features provide a coarse fit in our audio denoising task, greatly reducing the number of relevant examples to $K \ll N_E$, per input. Audio features finely discriminate among those examples.

For the m'th input segment, the set of K visual nearest-neighbors are found among the visual feature vectors:

$$K_m = \{k | d_V(\tilde{l}_m^V, \tilde{e}_k^V) < d_V(\tilde{l}_m^V, \tilde{e}_q^V), \forall q \notin K_m\}. \quad (12)$$

Here, $K_m \subset [1, \ldots, N_E]$ is of size $|K_m| = K$. The subset $\{\tilde{e}_k\}_{k \in K_m}$ represents candidate example vectors, whose videos highly resemble the input video segment $i_m^V$. Among those candidates, finer discrimination is achieved by penalizing for a high distance $d_A(\tilde{l}_m^A, \tilde{e}_k^A)$. Both criteria are compounded to a single data-term. Let $T_m$ be a threshold over $d_V(\tilde{l}_m^V, \tilde{e}_k^V)$, that sets $K_m$, as in (12):

$$d_V(\tilde{l}_m^V, \tilde{e}_k^V) \leq T_m, \forall k \in K_m,$$

$$d_V(\tilde{l}_m^V, \tilde{e}_q^V) > T_m, \forall q \notin K_m. \quad (13)$$

For audio, define $d_A^{max} = \max_{m,k} d_A(\tilde{l}_m^A, \tilde{e}_k^A)$. All the audio vector-distances are normalized by $d_A^{max}$, yielding $$\hat{d}_A(\tilde{l}_m^A, \tilde{e}_k^A) = d_A(\tilde{l}_m^A, \tilde{e}_k^A)/d_A^{max}, \quad (14)$$

where $0 \leq \hat{d}_A \leq 1$. A data-fitting cost for a selected example $k_m$ can then be posed as $$D(k_m) = [d_V(\tilde{l}_m^V, \tilde{e}_{k_m}^V) \leq T_m][\hat{d}_A(\tilde{l}_m^A, \tilde{e}_{k_m}^A) - 1]. \quad (15)$$

In Eq. (15), the left bracketed term is boolean, and it expresses the requirement that $k_m \in K_m$. The right bracketed term is continuous-valued, and it expresses the requirement for low audio misfit cost. The lower bound of $D(k_m)$ is −1, obtained when both the visual difference is low $(d_V \leq T_m)$ and the audio perfectly fits $(\hat{d}_A \to 0)$. This is the best we can strive for. The upper bound of $D(k_m)$ is 0, obtained if the visual difference is high $(d_V > T_m)$ or the audio fits poorly $(\hat{d}_A \to 1)$.

The cost $D(k_m)$ is associated with node (m, k) in the graph of FIG. 5. The data term of C sums Eq. (15) over all temporal segments of the input sequence $$D(k) = \sum_{m=1}^{M} [d_V(\tilde{l}_m^V, \tilde{e}_{k_m}^V) \leq T_m][\hat{d}_A(\tilde{l}_m^A, \tilde{e}_{k_m}^A) - 1]. \quad (16)$$

Rendering a Denoised Soundtrack

The selected digital audio track example $e_{\hat{k}_m}^A$ is a clean version of the noisy input $i_m^A$. A denoised output audio $a^{output}$ can apparently be created by concatenating the clear tracks corresponding to each consecutive input segment, $a_{simplistic}^{output} = [e_{\hat{k}_1}^A e_{\hat{k}_2}^A e_{\hat{k}_3}^A \ldots e_{\hat{k}_M}^A]$. As in image mosaicing, a long soundtrack is created by stitching short audio segments. A temporal segment m partial overlaps with consecutive and preceding segments.

The initial audio sample in each input segment is $$s_m^0 = 1 + (m-1)\rho p_F. \quad (17)$$

Figure 6:
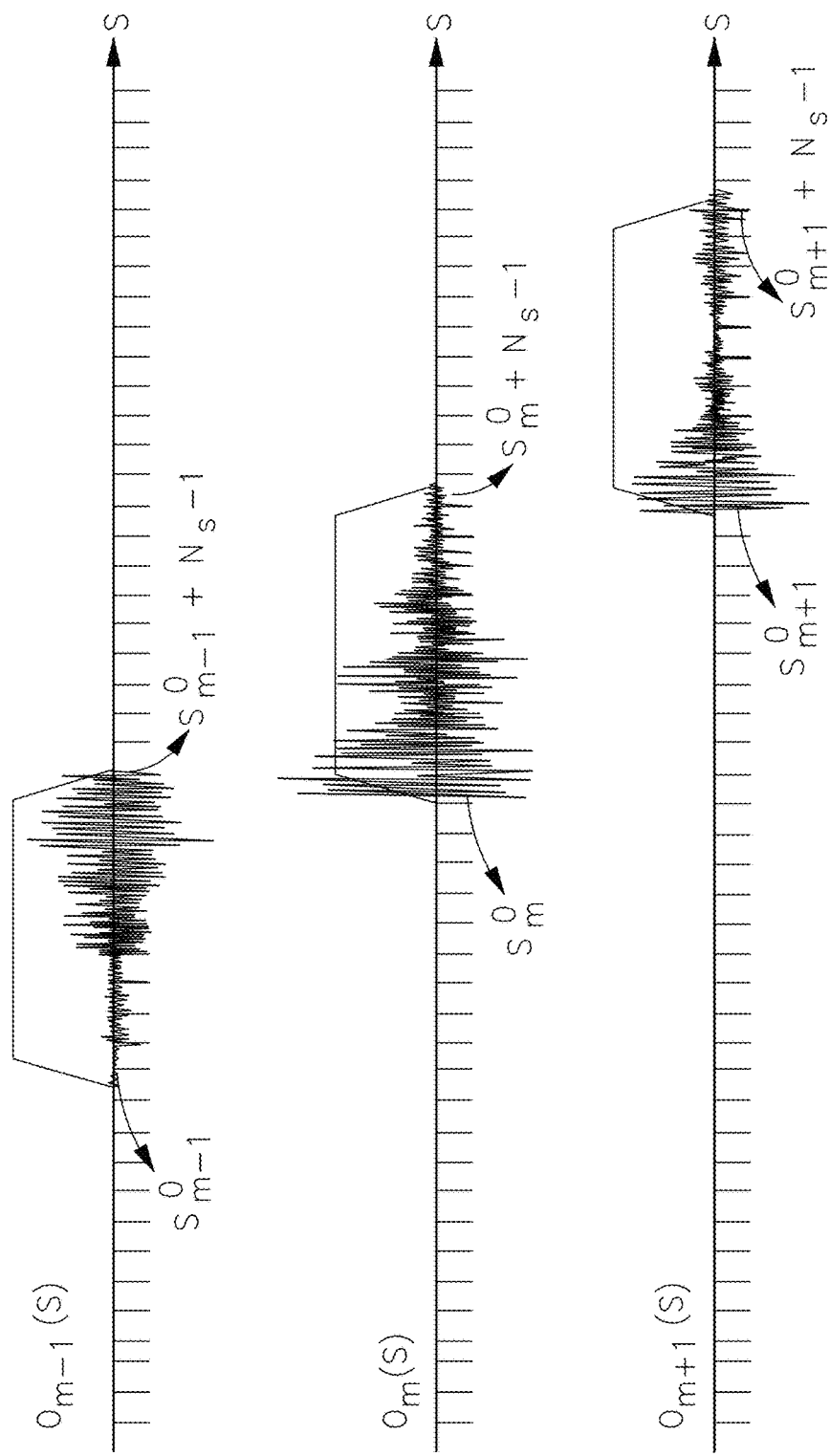
FIG. 6 shows a chart of an output soundtrack, in accordance with some embodiments.

FIG. 6 shows output soundtrack m which is silent, except for $[s_m^0, \ldots, (s_m^0 + N_S - 1)]$, which includes the denoised content $e_{\hat{k}_m}$. The trapezoidal windows illustrate a weighting function $w(s - s_m^0)$ used in audio mosaicing. Mosaicing output audio segments is done by fading in and out each segment, using the weighting function.

From (17), segment m is $[s_m^0, \ldots (s_m^0 + N_S - 1)]$. A denoised soundtrack $o_m$ corresponding to segment m is silent (zero valued) at all times, except for the specific temporal samples $[s_m^0, \ldots (s_m^0 + N_S - 1)]$ as illustrated in FIG. 6. There, the optimized example corresponding to segment m is $\hat{k}_m$. Its corresponding audio is $e_{\hat{k}_m}^A$. This audio is finely aligned as explained in. The temporal resolution of the video (upon which the examples $\hat{k}_m$ are primarily selected) is too coarse for audio. Thus, the audio undergoes a finer temporal alignment.

The sequence $o_m$ is feathered using a weighting function $w_m(s) = w(s - s_m^0)$. The output of our system is therefore the audio $$a^{output}(s) = \sum_{m=1}^{M} o_m(s) w(s - s_m^0). \quad (18)$$

Auditory and Visual Features

Audio Features

Auditory perception is sensitive to far fewer degrees of freedom than those of a raw soundtrack. Prior methods determine the essential compact features of audio, such that a simple $d_A$ measures the essential differences between perceived sounds. For stationary sounds in speech, such features are the mel-frequency Cepstral coefficients (MFCCs). Sound is generally not stationary throughout the temporal extent of an audio segment. Thus, each segment is divided into $N_T$ brief consecutive tiles, each indexed by t. Per tile t, the MFCCs yield a feature row-vector $m_t$. Thus, overall, the audio feature vector of the whole segment is $\tilde{e}^A = [m_1, m_2, \ldots, m_{N_T}]$, similarly for examples and input. In the present speech experiments, $N_T = 7$ was used, and each $m_t$ contains just 13 MFCCs.

In music experiments, spectrogram summation over time was used as the audio feature vector. This implies the harmonic structure typical to musical instruments.

Visual Features

Extraction of visual features may have three main steps:
1. Locking on the object of interest.
2. Extracting global motion by tracking
3. Extracting features unrelated to global motion.

In speech, the object of interest is around the mouth. Step 2 involves tracking the global location and orientation of the mouth. Other than image registration, no use of this global state is made here. Step 3 extracts features associated with lip motion. Low-level features were used: a stabilized region of interest around the mouth underwent spatio-temporal discrete cosine transformed (DCT). Based on the set E, $N_{DCT}$ DCT coefficients that have the highest variance are found. These $N_{DCT}$ DCT coefficients form the visual feature vector. In present experiments, the mouth is bounded by a 71×91 window, $N_F$=7 and $N_{DCT}$=1400.

In musical instruments, the motion of interest depends on the kinetics of instrument operation. For a stationary xylophone, the interest is on the global motion of a hitting mallet. Training examples in E are sequences having exclusive xylophone sounds: example k corresponds to a hit on the k'th bar of the xylophone. A sound commences when the mallet hits an object projected to a pixel whose horizontal and vertical coordinates are $x^e$ and $y^e$, respectively. The hit is a vertical minimum point. In the input sequence, we need to spot similar events. A local vertical minimum in the trajectory $x^i(f)=[x^i(f), y^i(f)]$ of input segment m is checked by the logical (binary) operator $$M \equiv [y^i(f_m^0+1) < \min \{y^i(f_m^0), y^i(f_m^0+2)\}], \quad (19)$$

where $N_F$=3. Being in the vicinity of the k'th bar is determined by the logical operator $$H_k \equiv \{\|x^i(f_m^0+1) - x^e(f_k^0+1)\|_2 < H\}. \quad (20)$$

Here H is a loose spatial tolerance for potentially being near a bar. It allows K bars to yield $H_k$=1 per frame, since the visual trajectory has ambiguities. The ambiguities stem from the xylophone being a 3D object (two levels) projected to a 2D video, and from a too coarse spatiotemporal resolution of the video, particularly for fast playing motion. Overall, the measure $$d_V(\tilde{i}_m^V, \tilde{e}_k^V) = \{\text{NOT } [M \text{ AND } H_k]\} \quad (21)$$

has a minimum value (zero) only at input video segments $i_m^V$ having spatial proximity to a sound-associated example $e_k^V$, while being at a minimum of the trajectory. Otherwise, $d_V$=1. If no sound-associated example $e_k^V$ matches $i_m^V$ using these features, then the denoised audio prompted by segment m is silence. In other cases, Eqs. (12, 21) yield K candidate examples, corresponding to different bars.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In some embodiments, the present denoising may be executed by a hardware processor of an apparatus, such as a portable or a desktop computing device, a smart phone, a tablet computer, a camera, etc. The apparatus may include or be associated with an image sensor configured for video capture. The image sensor may be a CCD (charge coupled device), a CMOS (complementary metal oxide semiconductor) or the like. The apparatus may include or be associated with a microphone. The hardware processor of the apparatus may receive video signals from the image sensor and audio signals from the microphone. Further, the apparatus may include or be associated with a non-transient memory which stores the training examples, which may include at least two relatively clear modalities (audio and video), as discussed above. Additionally or alternatively, the non-transient memory may store the results of a pre-calculated correlation between features exhibited simultaneously in the at least two relatively clear modalities. Namely, the non-transient memory may store correlated features exhibited simultaneously in the at least two relatively clear modalities.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Experiments

A simple camcorder working at a 25 Hz video rate was used. Audio was sampled at 8 kHz for speech and 16 kHz for music. After the recordings, strong audio noise was added to the test sequences, making them difficult to comprehend (SNR can be <<1). The noise types were varied and often highly non-stationary. They are listed in Table 1:

|  | Input | | |
| --- | --- | --- | --- |
| Noise Name | Digits | Bartender | Xylophone |
| Sweet | 0.07 | 0.36 | 0.9 |
| Phil | 0.09 | 0.59 | — |
| Female speech | 1.05 | 1.1 | — |
| Male speech | 2.4 | 0.3 | — |
| White Gaussian | 1 | 0.38 | 0.001 |
| Xylophone | — | — | 1 |

This table shows SNR values of each signal-noise combination. Added noises are:
  [Sweet] Music from the song Sweet Child of Mine by GNR.
  [Phil] Music from the song I Wish It Would Rain Down by Phil Collins.
  [Male speech] and [Female speech] from the TIMIT database. See Garofolo J. S.: Getting Started With the DARPA TIMIT CD-ROM: An Acoustic-Phonetic Continuous Speech Database. Gaithersburg, MD: National Inst. of Standards and Technol. (NIST) 1993.

Music and two speech denoising experiments were performed. A corpus of words was used, particularly digits $\{0, 1, \ldots, 9\}$. The first speech experiments included randomly pronounced digits. Training lasted 60 sec, and testing was based on a different video lasting 240 sec. The second experiment is of bartender speech, where a person says names of 30 beverages under strong noise from surrounding music. This is a much wider and more challenging corpus than digits. Training lasted 350 sec. The distinct testing video lasted 48 sec, corrupted by each noise type. Naturally, the sounds and appearances of lip motion varied during speech repetition.

Figure 7:
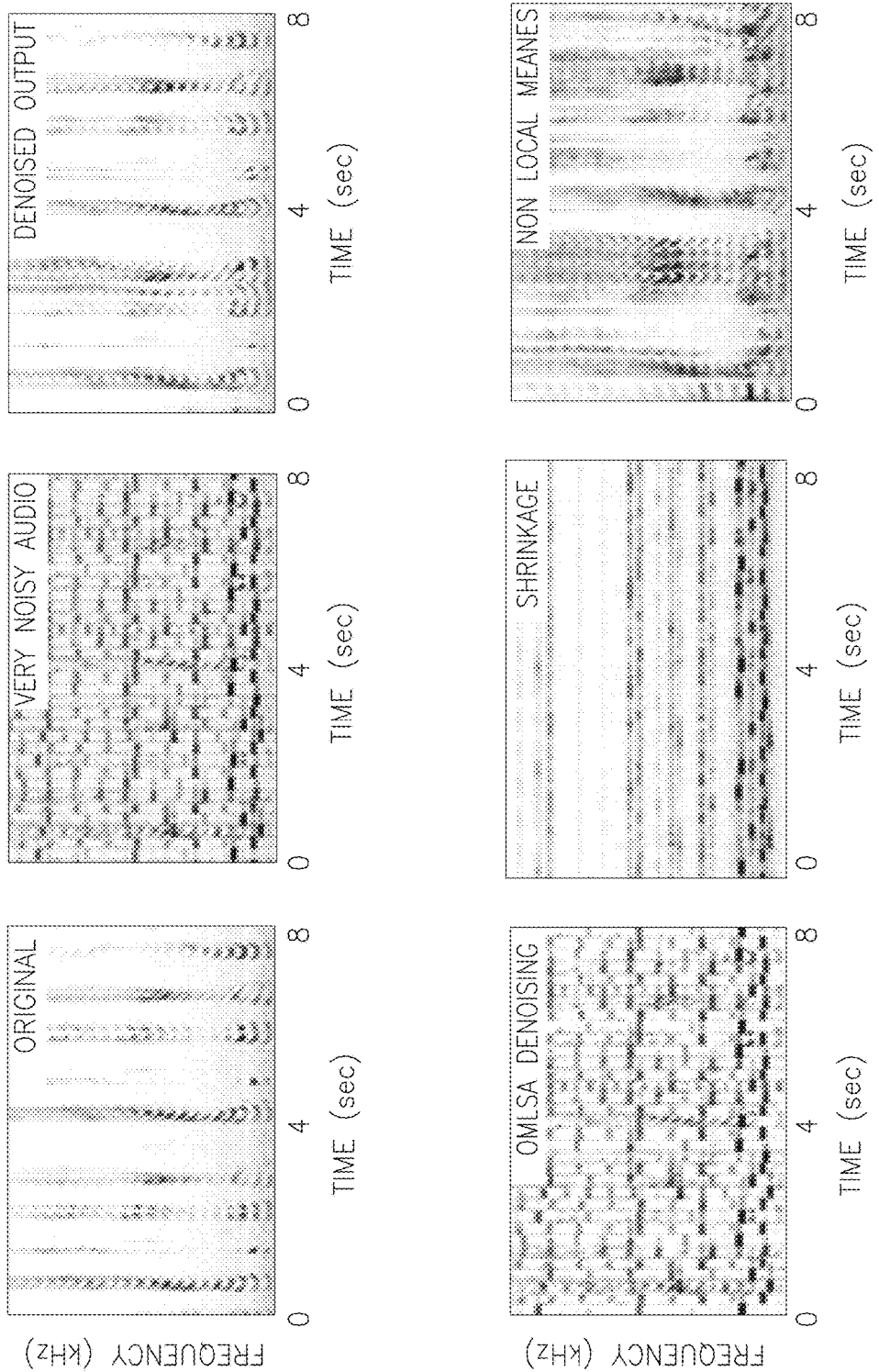
FIG. 7 shows spectrograms corresponding to the soundtrack of FIG. 1, in accordance with some embodiments.

For speech, $N_F=7$ and $N_S=2240$ were used, corresponding to 0.28 sec. $p_F=6$ was used on the test input. Sample frames and an 8 sec section of the noisy digits input are shown in FIG. 1, as is the corresponding denoised result. The latter is very similar to the original plot (not shown, as there is hardly any difference). This is also seen in spectrograms of the signals (FIG. 7). For clarity, the contrast of all shown spectrograms was stretched in the same manner in the display. Furthermore, the display is negative (dark elements express high energy).

The same applies throughout the long test sequences. As a consequence, the spoken digits are comprehendible, except for a few misses.

FIG. 7 shows spectrograms corresponding to the soundtracks described in FIG. 1 (8 out of 240 seconds). The noise is very intense (SNR=0.7). Top-right: our result. Bottom: results of other methods. The present method successfully denoised the signal while the other methods failed.

Figure 8:
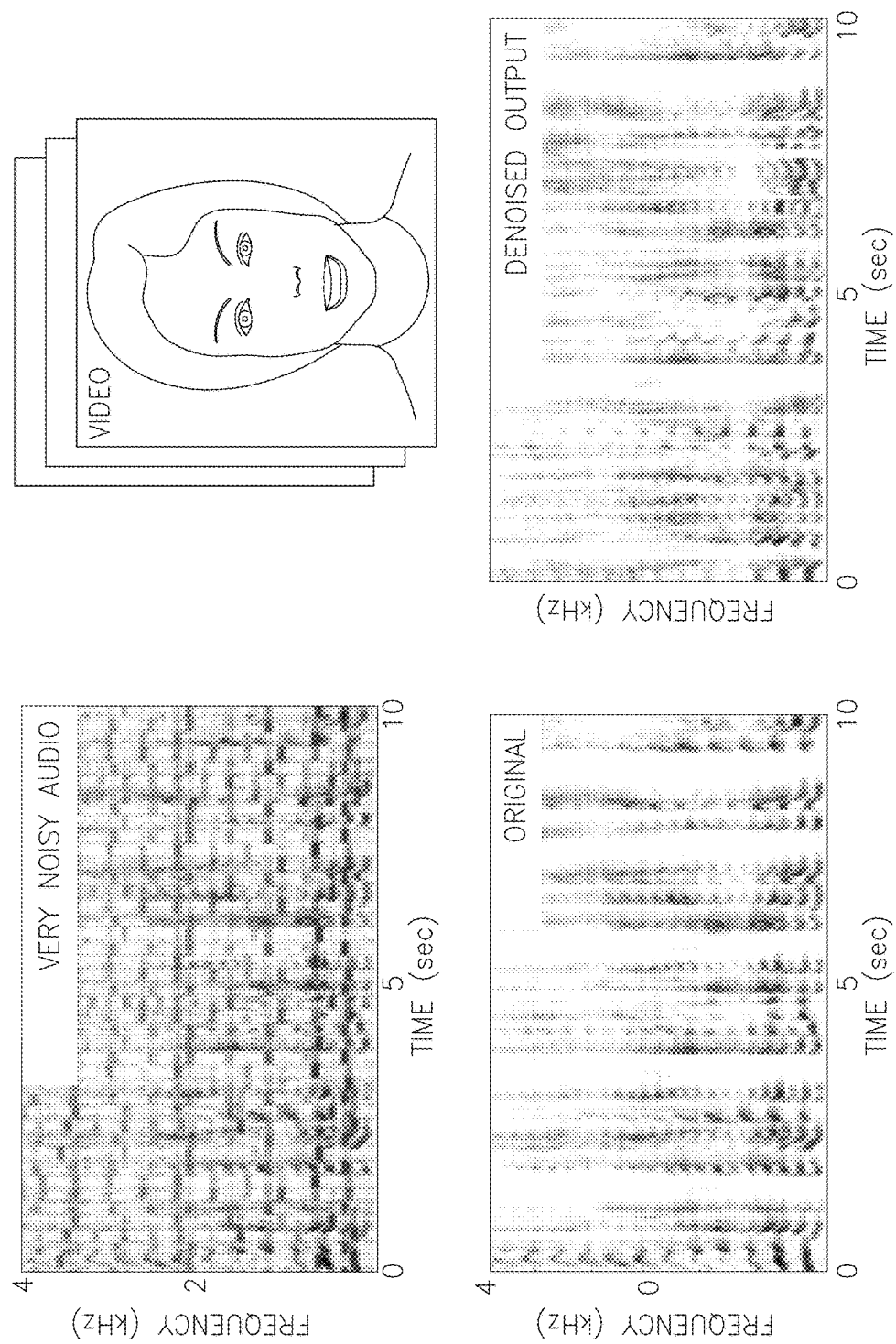
FIG. 8 shows spectrograms corresponding to a bartender experiment, in accordance with some embodiments.

The bartender experiment shows that the method can also be applied on a richer domain of signals. Sample frames, a 10 sec section of a noisy bartender input spectrogram and the corresponding denoised result are shown in FIG. 8, which spectrograms corresponding to the soundtracks of the bartender experiment (10 out of 48 seconds).

For music, a xylophone was played. Training lasted 103 sec, and testing was based on a different video lasting 100 sec. E was pruned: all examples were discarded, except for those having audio onsets. The examples' duration varies, $N_S \in [12800\text{-}25600]$, according to the lingering of each note. P was set to be uniform here. The noisy test movies included playing several tunes, to which the mentioned strong noises were added. One of the added noises is another melody of this xylophone. This kind of separation (denoising) is very challenging to unimodal audio techniques. The spatial tolerance H (Eq. 20) was set to detect up to K=5 candidates bars. During testing, the method handled well music that was played fast, in an arbitrary rhythm, since here $p_F=1$.

FIG. 9 shows sample frames, a spectrogram of a 10 sec section of the noisy input and the corresponding denoised spectrogram. The result is very similar to the clear original. Some differences stem from example segments having lower/higher sound intensities than the noisy input. Nevertheless, the resulting music completely got rid of the noise, and was recovered nicely. This is clearly demonstrated by watching (and hearing) the movies linked through. At the top of the figure there is shown an input video of a person playing a xylophone. The accompanied soundtrack is very noisy. The noise source is unknown, unseen in the field of view and highly non-stationary. At the bottom of the figure, the audio is denoised, with the aid of the video, yielding clear sound and comprehension.

Comparison to Other Methods

Consistently, cross-modal processing was by far superior to unimodal (audio-only or video-only) denoising:

Comparative Process 1: A process that was run on the examples and noisy inputs, unimodally on audio without video. The rendered results sound as a cacophony.

Comparative Process 2: Optimization of $\hat{k}$ used only video. The results sound more coherent than audio-only results, but still unclear.

Comparative Process 3: Several unimodal audio denoising methods were applied. State-of-the-art OMLSA (according to Cohen I., Berdugo B.: Speech enhancement for non-stationary noise environments. Signal Processing 81:2403-2418, 2001), shrinkage (according to Elad M.: Sparse and Redundant Representations—From Theory to Applications in Signal and Image Processing. Springer New-York, 2010) and non-local means denoising borrowed from image processing. In non-local means, the K examples are extracted by generalizing Eq. (12) to bimodal feature vectors, per input segment m $$K_m = \{k | d(\tilde{l}_m, \tilde{e}_k) < d(\tilde{l}_m, \tilde{e}_q), \forall q \notin K_m\}. \quad (22)$$

All unimodal audio denoising results were very poor.

There are unimodal denoising methods that cope with non-stationary noise. However, we show a scenario that would truly challenge unimodal denoising. One xylophone melody serves as interfering noise overlayed on an another, desired, xylophone melody. Produced by the same instrument, both have the same sounds. Indeed, the present method handles this scenario.

To quantify the performance in music, the percentage of correctly played notes was counted. On average, only 30% of the notes were correct in Comparative Process 1. Errors include missing notes, inserting notes at the wrong time and swapping notes. In cross-modal AV processing, 85% of the notes were correct. The following criterion for speech was used. First, an original sequence was "denoised" by the method. The selected example sequence in this case is $\hat{k}_{clear}$. When denoising a noisy version of the sequence, the result is k. The rate of correspondence between $\hat{k}_{clear}$ and $\hat{k}$ is the present criterion. The correspondence rate in {Process 1} was zero. This rate was 19% in Comparative Process 2 and 64%-75% in cross-modal processing. Table 2 below shoes quantitative evaluation. The correspondence rate of $\hat{k}_{clear}$ and $\hat{k}$ in the Bartender experiment:

| Noise Name | Minimizing D | Minimizing C |
| --- | --- | --- |
| Sweet | 24% | 67% |
| Phil | 25% | 68% |
| Female speech | 30% | 75% |
| Male Speech | 29% | 73% |
| White Noise | 16% | 64% |

What is claimed is:

1. A method for cross-modal signal denoising, the method comprising using at least one hardware processor for:
providing a first multi-modal signal comprising at least two relatively clear modalities;
correlating features exhibited simultaneously in the at least two relatively clear modalities of the first multi-modal signal;
providing a second multi-modal signal comprising at least one relatively noisy modality and at least one relatively clear modality; and
denoising the at least one relatively noisy modality of the second multi-modal signal by associating between (a) features exhibited in the at least one relatively noisy modality of the second multi-modal signal and (b) the correlated features of the first multi-modal signal.

2. The method according to claim 1, wherein said denoising comprises replacing the features exhibited in the at least one relatively noisy modality of the second multi-modal signal with the features exhibited in one of the at least two relatively clear modalities of the first multi-modal signal.

3. The method according to claim 2, wherein said replacing is based on a statistical analysis of the features of:
one of the at least two relatively clear modalities of the first multi-modal signal; and
features exhibited in the at least one relatively clear modality of the second multi-modal signal.

4. The method according to claim 2, wherein said replacing is based on a pattern recognition of the features of:
one of the at least two relatively clear modalities of the first multi-modal signal, and
features exhibited in the at least one relatively clear modality of the second multi-modal signal.

5. The method according to claim 1, wherein:
the at least two relatively clear modalities of the first multi-modal signal are an audio modality and a video modality;
the at least one relatively noisy modality of the second multi-modal signal is an audio modality; and
the at least one relatively clear modality of the second multi-modal signal is a video modality.

6. The method according to claim 1, further comprising dividing one of the at least two relatively clear modalities of the first multi-modal signal into a plurality of temporal segments.

7. The method according to claim 6, wherein each of the plurality of temporal segments is between 0.2 and 0.4 seconds long.

8. An apparatus comprising:
an image sensor configured for video capture;
a microphone;
a non-transient memory having stored thereon correlated features exhibited simultaneously in a relatively clear video modality and in a relatively clear audio modality both belonging to a first multi-modal signal; and
at least one hardware processor configured to:

(a) receive a second multi-modal signal comprising a relatively clear video modality from said image sensor and a relatively noisy audio modality from said microphone, and (b) denoise the relatively noisy audio modality of the second multi-modal signal by associating between (i) features exhibited in the relatively noisy audio modality of the second multi-modal signal and (ii) the correlated features of the first multi-modal signal.

9. The apparatus according to claim 8, wherein said at least one hardware processor is further configured to replace the features exhibited in the relatively noisy audio modality of the second multi-modal signal with the features exhibited in the relatively clear audio modality of the first multi-modal signal.

10. The apparatus according to claim 9, wherein said replace is based on a statistical analysis of the features of:
the relatively clear video modality of the first multi-modal signal; and
the relatively clear video modality of the second multi-modal signal.

11. The apparatus according to claim 9, wherein said replace is based on a pattern recognition of the features of:
the relatively clear video modality of the first multi-modal signal; and
the relatively clear video modality of the second multi-modal signal.

12. The apparatus according to claim 9, wherein said at least one hardware processor is further configured to divide the relatively clear audio modality of the first multi-modal signal into a plurality of temporal segments.

13. The apparatus according to claim 12, wherein each of the plurality of temporal segments is between 0.2 and 0.4 seconds long.

14. A computer program product for cross-modal signal denoising, comprising a non-transitory computer-readable storage medium having program code embodied therewith, the program code executable by at least one hardware processor to:
provide a first multi-modal signal comprising at least two relatively clear modalities;
correlate features exhibited simultaneously in the at least two relatively clear modalities of the first multi-modal signal;
provide a second multi-modal signal comprising at least one relatively noisy modality and at least one relatively clear modality; and
denoise the at least one relatively noisy modality of the second multi-modal signal by associating between (a) features exhibited in the at least one relatively noisy modality of the second multi-modal signal and (b) the correlated features of the first multi-modal signal.

15. The computer program product according to claim 14, wherein said denoise comprises replacing the features exhibited in the at least one relatively noisy modality of the second multi-modal signal with the features exhibited in one of the at least two relatively clear modalities of the first multi-modal signal.

16. The computer program product according to claim 15, wherein said replacing is based on a statistical analysis of the features of:
one of the at least two relatively clear modalities of the first multi-modal signal; and
features exhibited in the at least one relatively clear modality of the second multi-modal signal.

17. The computer program product according to claim 16, wherein said replacing is based on a pattern recognition of the features of:
one of the at least two relatively clear modalities of the first multi-modal signal, and
features exhibited in the at least one relatively clear modality of the second multi-modal signal.

18. The computer program product according to claim 14, wherein:
the at least two relatively clear modalities of the first multi-modal signal are an audio modality and a video modality;
the at least one relatively noisy modality of the second multi-modal signal is an audio modality; and
the at least one relatively clear modality of the second multi-modal signal is a video modality.

19. The computer program product according to claim 14, wherein said program code is further executable to divide one of the at least two relatively clear modalities of the first multi-modal signal into a plurality of temporal segments.

20. The computer program product according to claim 19, wherein each of the plurality of temporal segments is between 0.2 and 0.4 seconds long.

21. A method for cross-modal signal denoising, the method comprising using at least one hardware processor for:
providing correlated features exhibited simultaneously in a relatively clear video modality and in a relatively clear audio modality both belonging to a first multi-modal signal;
providing a second multi-modal signal comprising at least one relatively noisy modality and at least one relatively clear modality; and
denoising the at least one relatively noisy modality of the second multi-modal signal by associating between (a) features exhibited in the at least one relatively noisy modality of the second multi-modal signal and (b) the correlated features of the first multi-modal signal.

22. The method according to claim 21, wherein said denoising comprises replacing the features exhibited in the at least one relatively noisy modality of the second multi-modal signal with the features exhibited in one of the at least two relatively clear modalities of the first multi-modal signal.

23. The method according to claim 22, wherein said replacing is based on a statistical analysis of the features of:
one of the at least two relatively clear modalities of the first multi-modal signal; and
features exhibited in the at least one relatively clear modality of the second multi-modal signal.

24. The method according to claim 22, wherein said replacing is based on a pattern recognition of the features of:
one of the at least two relatively clear modalities of the first multi-modal signal, and
features exhibited in the at least one relatively clear modality of the second multi-modal signal.

25. The method according to claim 21, wherein:
the at least two relatively clear modalities of the first multi-modal signal are an audio modality and a video modality;
the at least one relatively noisy modality of the second multi-modal signal is an audio modality; and
the at least one relatively clear modality of the second multi-modal signal is a video modality.

26. The method according to claim 21, further comprising dividing one of the at least two relatively clear modalities of the first multi-modal signal into a plurality of temporal segments.

27. The method according to claim 26, wherein each of the plurality of temporal segments is between 0.2 and 0.4 seconds long.

* * * * *